United States Patent [11] 3,567,935

| | | |
|---|---|---|
| [72] | Inventor | Walter A. Nagel<br>Houston, Tex. |
| [21] | Appl. No. | 703,678 |
| [22] | Filed | Feb. 7, 1968 |
| [45] | Patented | Mar. 2, 1971 |
| [73] | Assignee | Schlumberger Technology Corporation<br>New York, N.Y. |

[54] MEASURING APPARATUS AND METHOD
6 Claims, 3 Drawing Figs.

[52] U.S. Cl. .................................................. 250/83.1,
    250/83.3, 250/83.6
[51] Int. Cl. .................................................. G01t 3/00,
    G01v 5/00
[50] Field of Search ........................................ 250/83.6
    (W), 83.1, 71.5, 83.3

[56] References Cited
UNITED STATES PATENTS

| | | | |
|---|---|---|---|
| 3,462,600 | 8/1969 | Dewan ........................ | 250/83.6WX |
| 2,469,462 | 5/1949 | Russell ........................ | 250/83.6W |
| 2,776,378 | 1/1957 | Youmans ..................... | 250/83.6W |
| 3,413,466 | 11/1968 | Allen Jr. ..................... | 250/71.5 |
| 3,435,217 | 3/1969 | Givens ........................ | 250/83.6W |

OTHER REFERENCES

Tinch et al., " Computer Application," June 1966, p 687—696, 83.6W

*Primary Examiner*—Archie R. Borchelt
*Assistant Examiner*—Morton J. Frome
*Attorneys*—William R. Sherman, Richard E. Bee, Donald H. Fidler, Stewart F. Moore and John P. Sinnott

ABSTRACT: An earth formation porosity logging tool in accordance with an illustrative embodiment of the invention comprises a neutron source and four neutron detectors spaced at different distances from the source for transport through a borehole. Signals are obtained that correspond to the ratios of the counts registered by the two short-spaced detectors and the two long-spaced detectors. The effect of the borehole on the formation porosity measurement is compensated by combining these ratio signals to eliminate the influence of the borehole neutron relaxation length and converting the resultant signal into an output signal that more accurately indicates the formation porosity.

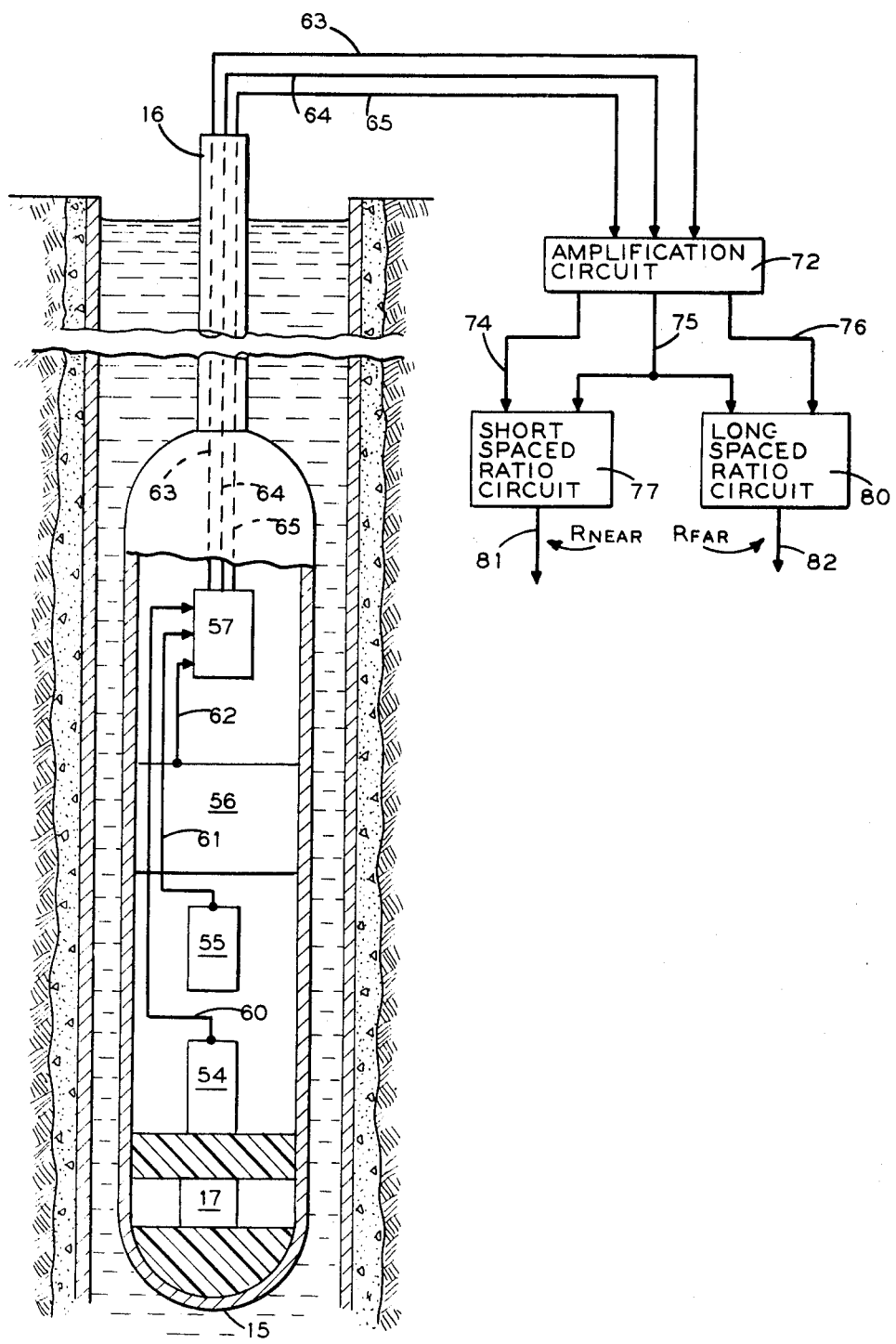

MEASURING APPARATUS AND METHOD

BACKGROUND OF THE INVENTION

1. Field of the Invention

This invention relates to borehole logging methods and apparatus and, more particularly, to an improved technique for measuring porosity by observing the behavior of neutrons within an earth formation, and the like.

2. Description of the Prior Art

In the prior art, proposals were advanced to measure the neutron diffusion and absorption characteristics of earth formations in order to determine formation hydrogen content. Hydrogen, which is generally most abundant in the pore fluids, often identifies those formations that are likely to produce economically significant quantities of oil.

Typically, a tool according to one of these proposals comprised a housing that contained a neutron-emitting source. Two radiation detectors within the housing were spaced at different distances from the source. These detectors produced signals that corresponded to the profile or spatial distribution of the emitted neutrons within the formation and the borehole. In effect, the two detectors measured the neutron population at two points spaced from the source. These two points identified the rate of decline in the neutron population as a function of distance from the source. This decline rate, or the slope of the neutron distribution in an earth formation, was believed to be related uniquely to the hydrogen content of the formation under study.

This suggestion, however sound in theory, has failed to satisfy the need for a tool with a practical source-detector spacing for several reasons. Primarily, the ratio of the detector signals vary in response to changes in the borehole conditions as well as to changes in the formation porosity. For example, a change in the ratio of the detector signals may indicate an increase in the borehole diameter or an increase in the earth formation porosity. Accordingly, these proposed tools produce ambiguous results because variations in the ratio of detector signals alone fail to disclose the physical reason that caused the observed change.

These borehole influences decline with increasing source-to-detector spacings. If the separations are made sufficiently large to minimize borehole effects, the count rates from the detectors decline to a level of statistical unreliability. The prior art failed to resolve this dilemma. Thus, a requirement exists for a neutron logging tool that gives formation porosity accurately under changing borehole conditions.

Therefore, it is an object of the invention to provide an improved formation porosity logging tool.

It is a further object of the invention to measure the neutron diffusion characteristics of an earth formation in the presence of a changing borehole environment with greater accuracy than heretofore possible.

It is still another object of the invention to provide an improved multiple neutron detector logging tool.

SUMMARY

Ordinarily, neutrons emitted from a tool within a borehole establish a spatial distribution that, over a limited region, may be approximated by the expression:

$$Ce^{-x/L} \quad (1)$$

where $e$ is the base of the system of natural logarithms; $x$ is distance from the neutron source along the borehole; $C$ is a weighting coefficient; and $L$ is the relaxation length which determines the rate at which the neutron flux falls off in the foregoing representation of the neutron distribution. Neutron relaxation length usually is defined as the reciprocal of the total macroscopic neutron absorption cross section ($\Sigma$). The macroscopic cross section moreover, is equal to the expression:

$$\frac{\rho}{A} N a 6$$

Consequently:

$$L = \left(\frac{\rho}{A} N a 6\right)^{-1} \text{ or } L = \Sigma^{-1}$$

where $\rho$ is the density of the medium in question, $A$ is the atomic weight, $Na$ is the Avogadro number and $6$ is the microscopic cross section. Analysis of experimental data indicates that the slope of the neutron distribution is in a practical logging situation is determined by a relaxation length that largely reflects the borehole features $L_{borehole}$, and a different relaxation length, $L_{formation}$, that represents the characteristics of the earth formation. Close to the neutron source the borehole relaxation length exerts a dominant influence on the neutron distribution. At greater distances from the source, depending on the composition of the formation and the condition of the borehole, the neutron distribution is more clearly measured in terms of the formation relaxation length.

One proposal to overcome the adverse influence of the borehole environment has been directed to the observation and interpretation of empirical relations between detector signal ratios and the earth formation porosity. Accordingly, two neutron detectors are spaced close to, but at different distances from the source, largely to reflect the borehole characteristics. Two far-spaced detectors, hereinbefore mentioned in connection with the prior art, have a greater depth of investigation, and thus their signals are more nearly indicative of the formation characteristics. A ratio of the short-spaced detector signals is contrasted directly with a ratio of the long-spaced detector signals according to an empirical relation that identifies the porosity of the formation under consideration. This specific technique is described in more complete detail in the patent application of Jay Tittman titled "Measuring Apparatus and Method," which was filed at the same time as the instant application for patent and accorded Ser. No. 703,679.

This foregoing proposal, although accurately identifying the formation porosity, does not provide a direct indication of the physical processes affecting the neutron distribution within the formation. Consequently, a need exists for a technique that will measure the formation relaxation length as well as the formation porosity.

More particular, a ratio is struck between the signals provided by two primary thermal neutron detectors within a logging tool. The detectors are spaced at sufficient, but different, distances from a neutron source to respond principally to those neutrons that have penetrated the formation to a great enough depth to be representative of the earth formation porosity.

Two additional neutron detectors within the housing are placed at different distances closer to the neutron source than the primary pair of neutron detectors. The additional neutron detection equipment spacing is so short relative to the neutron source that the signals produced generally reflect the borehole conditions. The short-spaced detection equipment signals are used to produce a secondary signal ratio that is combined with the primary ratio to compensate for the influence of the borehole.

Specific details of an illustrative device for producing the far detector signal ratio is described in application Ser. No. 570,068 filed Aug. 3, 1966, for "Measuring Apparatus and Method" by Stanley Locke, Harold Sherman and John S. Wahl and assigned to the same assignee as the invention described herein now U.S. Pat. No. 3,483,376.

In an exemplary embodiment of the invention, the second pair of neutron detectors are spaced within the housing at different distances from the source that are, moreover, less than the separation between the source and the aforementioned pair of formation responsive neutron detectors. Appropriate electrical circuits are provided to combine the ratio signals in accordance with a predetermined relation that identifies the formation relaxation length and the formation porosity in spite of changes in the borehole size, and the like.

In practicing the invention, it is preferable for the near-spaced and far-spaced neutron detectors to respond to thermal neutrons, that is, those neutrons that have average kinetic energies which are approximately the same as the constituents of the medium through which they are diffusing.

An alternative embodiment of the invention combines the signals from three neutron detectors, each spaced a different distance from the neutron source. The short-spaced and intermediate-spaced detectors provide the near signal ratio and the intermediate- and far-detector signals establish the far signal ratio. These ratios are combined in the aforementioned manner to produce an accurate indication of the formation porosity.

For a better understanding of the present invention, together with other and further objects thereof, reference is had to the following description taken in connection with the accompanying drawings, the scope of the invention being pointed out in the appended claims.

BRIEF DESCRIPTION OF THE DRAWING

FIG. 3 is a schematic diagram of another embodiment of the invention.

DESCRIPTION OF THE PREFERRED EMBODIMENTS

Figure 1:
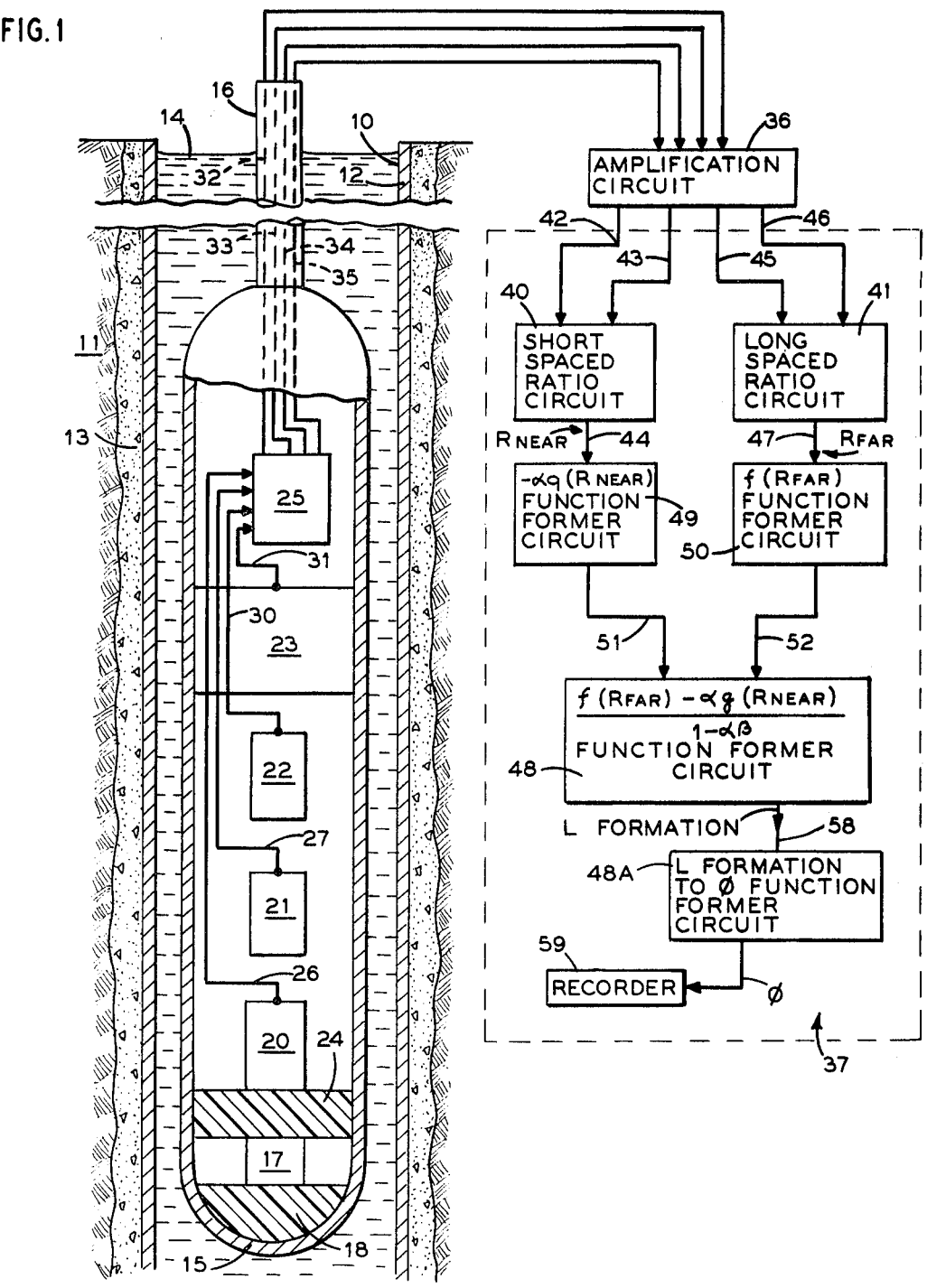
FIG. 1 is a schematic diagram of a borehole logging tool in partial section according to one embodiment of the invention, showing the electrical circuits associated therewith in block diagram form.

A typical embodiment of the invention is shown in FIG. 1.

A borehole 10 formed in an earth formation 11 may be open (not shown) or cased with one or more strings of steel pipe 12 to prevent the borehole wall from caving in. An irregular annulus of cement 13, moreover, is set between the formation 11 and the pipe 12 to prevent vertical fluid communication between the different formations traversed by the borehole 10. The borehole may be filled with gas, air or borehole liquids 14, as shown.

A logging tool in accordance with the invention comprises a pressure resistant housing 15 of steel or the like, which is suspended from a multiconductor armored cable 16 in order to be lowered into and withdrawn from the borehole during logging operations. A winch (not shown) located on the surface of the earth is used to lower and raise the apparatus in the borehole in the customary manner to traverse the earth formation 11.

Depending on the physical environment of the borehole, the presence of liquids 14 and the character of the earth formation 11, the pressure housing 15 may be suspended freely within the borehole 10 as shown, centered within the borehole by means of bowsprings or the like (not shown) or pressed against one side of the borehole 10 to provide a "sidewall" tool (also not shown).

A neutron source 17 is positioned within the lowermost end of the pressure housing 15. Although the neutron source 17 may be an electrically operated neutron generator, it is preferable to use a "chemical" source, for example, a mixture of plutonium and beryllium or americium and beryllium that continuously emit neutrons as a result of nuclear processes occurring between the constituent source materials. It has been found that a source of about 20 curies strength provides a significantly improved log when used in connection with the invention. The 20 curies source 17 is about four to five times more active than the usual logging tool neutron sources. The extra expense and safety precautions, however, that are required by the more active source are well justified in view of the superior log thus provided. The neutron source 17 is supported in the housing 15 by a mass of scattering material 18 formed, for example, of steel, copper, hevimet or an appropriate combination of materials of this sort.

Neutrons emitted from the chemical source 17 have an average initial energy of about 5 million electron volts (MeV). Many of these neutrons penetrate the fluid 14, the pipe 12, the cement annulus 13 and diffuse through the formation 11. The diffusing neutrons collide with the nuclei in the atomic structure of the borehole and formation materials. These collisions produce different results according to the energy of the colliding neutron and the nature of the individual nucleus under consideration. From the viewpoint of the invention, only two types of collision are of interest. First, the initial high energy neutrons collide elastically with nuclei and transfer some energy to each nucleus so struck. In this manner the neutrons lose energy until their average kinetic energy is in equilibrium with the medium through which they are diffusing. Hydrogen, a major constituent of the borehole fluid 14 and the cement 13, absorbs disproportionately more energy from the irradiating neutrons through this process than elements of higher atomic number, as for example, calcium and other common earth formation constituents. Thus, thermal neutrons, especially those in the immediate vicinity of the source 17, are more indicative of the hydrogen content of the borehole environment than they are of the formation characteristics.

Figure 2:
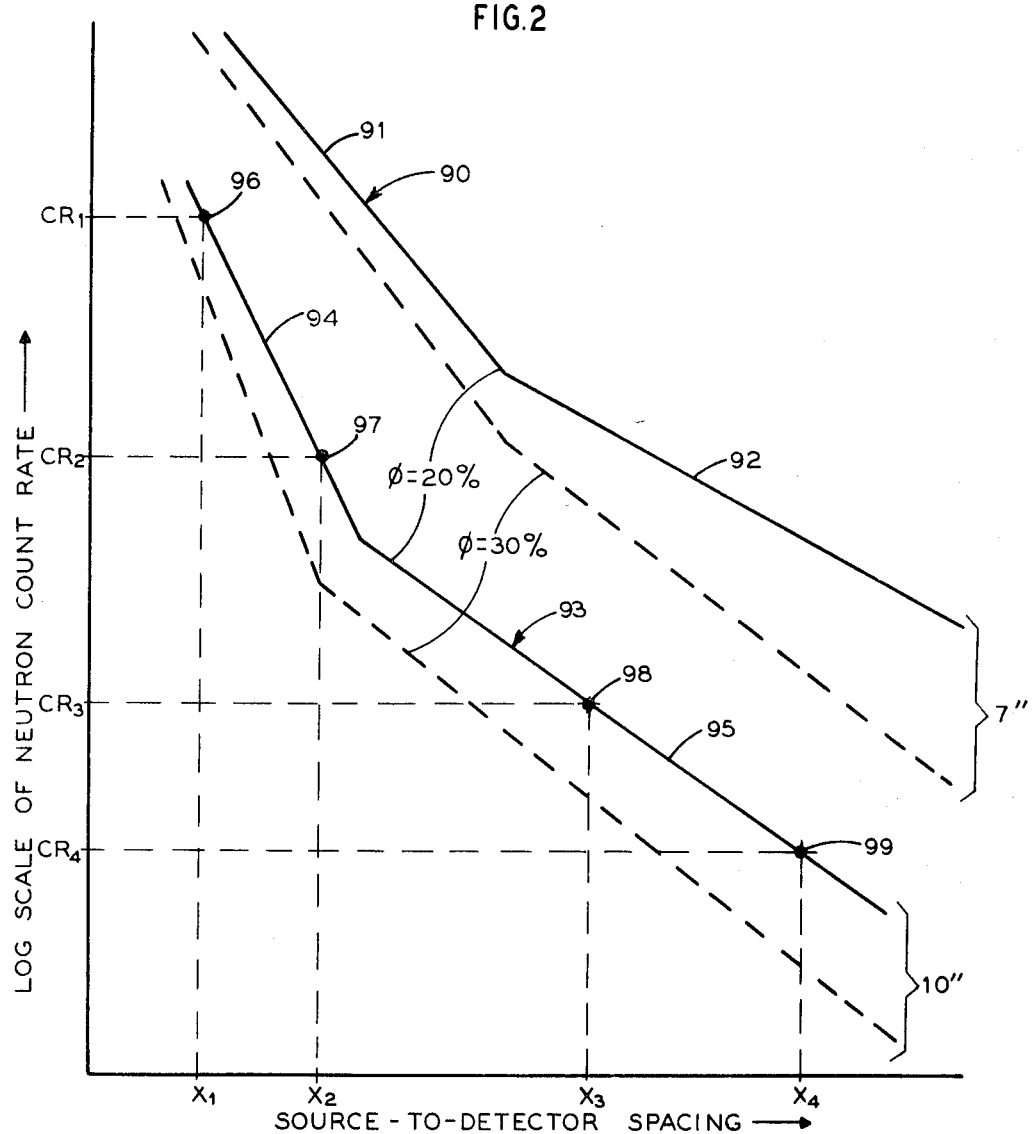
FIG. 2 is a semilogarithmic graph of neutron density as a function of source-to-detector spacing in which some of the neutron distribution characteristics have been exaggerated to illustrate the principles of the invention.

The second interaction is absorption, in which the colliding neutron is captured by the nucleus. Reactions of this sort occur most frequently among thermal neutrons, and usually result in the removal of the colliding neutrons from the irradiating neutron population. Consequently, elastic collisions largely are responsible for the diffusion of the irradiating neutrons through the formation 11. This general diffusion away from the source 17 also produces a more or less logarithmic decline in the neutron density with increasing separation from the source as shown in FIG. 2. Neutron capture also contributes to this decline in the neutron population in a complicated relation that depends, in part, on the relative abundance of the different elements present in the formation and the borehole.

As hereinbefore mentioned, the slope of the neutron distribution as observed within the borehole is determined by the relaxation length of the neutrons within the formation and the neutron relaxation length in the borehole. FIG. 2 shows the portions of this neutron spatial distribution that are dominated by the respective parameters. Features of the curves shown in this figure have been exaggerated to emphasize the relaxation length influences for illustrative purposes. For example, the change in neutron distribution with separation from the neutron source as registered in a 7-inch diameter cased borehole transversing a 20 percent porous earth formation is shown by a curve 90. The curve 90 is comprised of a steeper sloping portion 91 in the vicinity of the neutron source and a more gradually declining portion 92 spaced outwardly from the source. In actuality, the curve is smooth and not made up of straight line segments as shown in FIG. 2.

Thus, a curve 93 characterizing a 10-inch diameter cased borehole in a 20 percent porous formation is comprised of a portion 94 in the vicinity of the neutron source, and a portion 95 that becomes dominant at a greater distance from the source. The slope of the portion 94 is calculated by taking a ratio, $R_{near}$, of the neutron count rates $CR_1$ and $CR_2$ as identified by points 96 and 97, respectively. Similarly, neutron count rates $CR_3$ and $CR_4$, identified by points 98 and 99, are combined to establish a ratio $R_{far}$ that describes the slope of the portion 95. $R_{near}$ and $R_{far}$ are then combined in such a way to obtain the formation neutron relaxation length, $L_{formation}$. Analytically, this is expressed:

$$L_{formation} + \alpha L_{borehole} = f(R_{far}) \qquad (2)$$

and $$L_{borehole} + \beta L_{formation} = g(R_{near}) \qquad (3)$$

where $L_{borehole}$ is the borehole neutron relaxation length, while $\alpha$ and $\beta$ are weighting factors; and $f$ and $g$ are functions that depend on a specific tool design. Thus, for a particular tool, values for $\alpha$, $\beta$, $f$ and $g$ can be determined from empirical data which includes graphs of $R_{near}$ and $R_{far}$ under a variety of known borehole conditions and formation porosities. For instance, turning once more to FIG. 2, $L_{formation}$ for a specific condition can be determined through a measurement of the macroscopic neutron absorption cross section, $\Sigma$, of a core sample taken from a borehole wall. This measurement is carried out through conventional techniques, a typical method for accurate $\Sigma$ (or $L_{formation}^{-1}$) measurement being described in Neutron Physics by K. H. Beckurts et al., Springer–Verlag, New York, Inc. Wurzburg, Germany, 1964, pages 374 to 376. Knowing $L_{formation}$, and core sample porosity, four separate source-to-detector spacings can be arranged in a logging tool as illustrated in FIG. 2 in order to provide four sets of count rate data, each data set being taken from an individual logging run with a different source-to-detector spacing configuration. These four sets of count rate data and the known value of $L_{formation}$ are substituted in equation (4) in order to provide a group of four simultaneous equations that can be solved for the four unknown values of $\alpha$, B, $f(R_{far})$ and $g(R_{near})$. Solving equations (2) and (3) for $L_{formation}$:

$$L_{formation} = \frac{f(R_{far}) - \alpha g(R_{near})}{1 - \alpha\beta} \quad (4)$$

Consequently, proper manipulation of $R_{far}$ and $R_{near}$ enables $L_{formation}$ to be determined independently of the borehole relaxation length. Because the relaxation length is strongly influenced by the hydrogen content, or the porosity of the formation, $R_{far}$ and $R_{near}$ can be directly related to identify porosity.

To accomplish this purpose in accordance with the invention, FIG. 1 shows four neutron detectors 20, 21, 22 and 23 positioned within the housing 15 each at different axial distances from the source 17. Typical spacings between the effective centers of the detectors 20, 021, 22 and 23, as measured from the effective center of the neutron source 17, are respectively 4", 8", 16" and 25". The actual spacings between these detector centers are, of course, flexible, and the spacings suggested herein are only representative values.

Direct neutron radiation from the source 17, moreover, is attenuated by a shield 24 of copper, hevimet, or the like, or an appropriate combination of these materials. The detectors 20 through 23 measure the porosity of the formation 11 and compensate this measured porosity for the effect of changes in the borehole environment as reflected in the neutron population in the immediate vicinity of the detectors 20 and 21 which are located closest to the source.

Preferably, the detectors 20 through 23 are helium 3 ($He^3$) counting tubes which produce a charge pulse or a "count" in response to each incident neutron. Alternatively, the neutron detectors 20 through 23 may respond to gamma radiation emitted as a consequence of neutron interactions with the borehole and formation constituents. Typically, a $He^3$ detector tube comprises a hollow cylindrical cathode surrounding a centrally disposed anode wire (not shown). The volume between these electrodes is filled with gaseous $He^3$ at a pressure of about four or more atmospheres. The irradiating neutrons collide with the $He^3$ atoms in the gas and initiate nuclear reactions. Each reaction causes some filling gas ionization which produces an electrical charge pulse in the electrodes that is representative of the reaction energy. Detector tube 22, for example, may be 7¼ inches in length and 1¾ inches in diameter such that the transverse area of the detector tube 22 is substantially less than the corresponding transverse area of the housing 15.

The neutron detector tube 23 in the embodiment of the invention shown in FIG. 1 preferably has a length of 9¼ inches and a diameter of 2¼ inches. The diameter of the tube 23 is substantially coextensive with the corresponding diameter of the housing 15 to enable the tube 23 to be as large as the physical limitations of the housing 10 will permit. The large active volume of the tube 23 accommodates the maximum amount of $He^3$ gas attainable within the constraints imposed by a reasonable housing diameter in order to provide the best possible neutron sensitivity.

As described in more complete detail in the aforementioned Locke et al. patent application, a ratio of the neutron counts registered by the two far-spaced detectors 22 and 23 ordinarily produces an indication of the formation porosity when the borehole diameter and cement thickness are known with reasonable accuracy. In a practical well logging situation, however, both of these factors frequently are not known or cannot even be estimated with reliability. For example, caving in the wall of the borehole 10 behind the steel pipe 12 and the resulting increase in thickness of the cement annulus 13 filling the void space thus formed cannot be determined readily.

One aspect of the invention enables the ratio signal obtained from the neutron detectors 20 and 21 to be manipulated to correct the apparent porosity of the formation 11 registered by the detectors 22 and 23 for the effect of borehole size and cement thickness. It will be recalled that the neutron detectors 20 and 21 are spaced close to the neutron source 17 and respond primarily to the borehole environment.

Turning once more to the exemplary physical structure shown in FIG. 1, signals from the neutron detectors 20 through 23 are sent to a downhole signal transmission circuit 25 through conductors 26, 27, 30 and 31, respectively. The neutrons registered in each of these detectors produce respective accumulations of counts that preferably are amplified and scaled by an appropriate factor in the downhole transmission circuit 25. These processed signals then are sent to the earth's surface through respective conductors 32, 33 34 and 35 in the armored cable 16.

At the earth's surface the signals in the conductors 32 through 35 are individually amplified in an amplification circuit 36. The circuit 36, moreover, may contain pulse height discriminators to distinguish the signal from noise and further scaling circuits to simplify the data handling problem in a porosity computation circuit 37.

The porosity computation circuit 37 comprises a pair of ratio circuits 40 and 41. The ratio circuits 40 and 41, for example, are of the type described in more complete detail in the aforementioned Locke et al. patent application. Ratio circuit 40 is coupled to the output of the amplification circuit 36 through conductors 42 and 43 in order to establish a signal that corresponds to the ratio $R_{near}$ which is composed of the outputs from the short-spaced neutron detectors 20 and 21. The short-spaced ratio circuit 40 applies the $R_{near}$ signal to a conductor 44.

In a similar manner the long-spaced ratio circuit 41 responds to output signals from the amplification circuit 36 in conductors 45 and 46 that correspond to the signals from the long-spaced neutron detectors 22 and 23. The output from the long-spaced ratio circuit 41, $R_{far}$, is a quotient that comprises the neutron activity observed by the detector 22 and the neutron activity registered by the most distantly spaced neutron detector 23. The $R_{far}$ signal is coupled to an output conductor 47.

The short-spaced and long-spaced detector signal ratios in the conductors 44 and 47, respectively, are applied to individual function former circuits 49 and 50. The function former circuit 50 converts the $R_{far}$ signal to an output that corresponds to the specific function of $R_{far}$ hereinbefore considered, $f(R_{far})$, which depends on the particular tool design. Similarly the function former circuit 49 simultaneously converts the $R_{near}$ input into a signal that corresponds to $-\alpha g(R_{near})$. The $f(R_{far})$ and $-\alpha g(R_{near})$ signals are sent through conductors 52 and 51, respectively, to a function former circuit 48 that combines these input signals according to the expression:

$$\frac{f(R_{far}) - \alpha g(R_{near})}{1 - \alpha\beta} \quad (5)$$

This expression is, of course, equal to $L_{formation}$.

The $L_{formation}$ signal then is sent through a conductor 58 to an $L_{formation}$ to $\Phi$ function former circuit 48A. This last circuit 48A produces a signal that corresponds to the formation porosity, $\Phi$, in accordance with empirically derived data. Typically, the individual function former circuit 48, 48A, 49 and 50 each can take the form of an operational amplifier having a resistor-diode network connected in the amplifier feedback circuit. The circuit parameters and biasing of each function former circuit are so chosen as to take into account the weighting factors $\alpha$ and $\beta$, and the like.

Depending on the mineral composition of an earth formation under consideration, for example, limestone, sandstone or a mixture of limestone and sandstone, individual function former circuits can be selectively connected to the output conductor from the ratio circuits to adjust the weighting factors and other coefficients comprising the equation (4) for differences in tool response in these different mineral structures. The data needed to establish the values of the electrical components in the function former circuits can be developed from trials in test formations of known porosity and mineral composition. This data is organized initially into a comprehensive series of graphs. The function former circuits then are arranged to produce responses that approximate respective formation characteristics as represented by each graphical relation.

Thus, as the housing 15 is drawn upward through the borehole 10 and the composition of the earth formation 11 changes, the appropriate function former circuits commensurate with the new formation mineral composition can be connected manually, if desired, to the ratio circuit output conductors 44 and 47. The approximate mineral composition of each of the earth formations so traversed, moreover, can be determined through an examination of drill cuttings or the like which usually are available in the "driller's log," in order to facilitate the function former circuit substitutions.

The porosity signal from the function former circuit 48A is applied to a recorder 59 in order to make a graph of formation porosity in terms of borehole depth.

An alternative embodiment of the invention is shown in FIG. 3. Three neutron detectors—a short-spaced detector 54, an intermediate-spaced detector 55 and a long-spaced detector 56, all of which preferably are of the type described in connection with the embodiment of the invention shown in FIG. 1—are separated from the neutron source 17 each by different distances. The furthest spaced detector 56, the effective center of which is preferably about 25" from the effective center of the source 17, has transverse dimensions that are substantially coextensive with the interior of the housing 15 as hereinbefore described in connection with the detector 23 in FIG. 1. The detectors 54 through 56, moreover, are shielded from direct source radiation to produce maximum sensitivity to neutrons that have traversed the formation.

Signals from the detectors 54 through 56 are sent to a downhole transmission circuit 57 through conductors 60, 61 and 62, respectively. The transmission circuit 57 processes the neutron detector signals for transmission to the earth's surface through conductors 63, 64 and 65 in the armored cable 16.

The neutron detector signals go directly to an amplification circuit 72. The output from the amplification circuit 72 is applied to short- and long-spaced ratio computation circuits 77 and 80, respectively, through conductors 74, 75 and 76.

The signals from the short-spaced detector 54 and the intermediate-spaced detector 55 both are applied to the short-spaced ratio circuit 77 to establish an output signal $B_{near}$ in a conductor 81. The signal from the intermediate-spaced detector 55 in the conductor 75 also is combined with the signal from the long-spaced detector 56 in the long-spaced ratio circuit 80. The output from the circuit 80 is coupled to a conductor 82 and corresponds to the detector signal ratio $R_{far}$. These ratio signals are combined subsequently in the manner hereinbefore described in more complete detail in connection with FIG. 1, to produce a graph of formation porosity as a function of borehole depth.

It will be recalled that in some logging conditions it is preferable to eccentrically position the housing shown in FIGS. 1 and 3 to enable the tool to ride against the borehole wall. In this circumstance it may be advantageous to collimate the neutron beam from the source 17 and eccentrically mount at least some of the detectors so that they are adjacent to the portion of the housing 15 that is tangent to the borehole wall.

The neutron detectors in the embodiments of the invention shown in FIGS. 1 and 3 are positioned at different distances vertically above the neutron source 17. Alternatively, the neutron source 17 may be straddled by one or more of the detectors. A configuration of this latter character prevents the nested arrangement of detectors, shown in the drawing, from masking or absorbing a significant portion of the neutron population that ought to be registered by each of the successively longer-spaced detectors. The volume within the housing between the source and the straddling detectors, moreover, can be filled with a neutron thermalizing or moderating material as described in more complete detail in U.S. Pat. application Ser. No. 663,596 filed Aug. 28, 1967 for "Logging Technique" by Walter A. Nagel and assigned to the same assignee as the invention described herein.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

I claim:

1. A borehole tool for logging earth formations comprising a housing, a neutron source within the housing for establishing a neutron distribution within the borehole and the earth formations, four neutron detectors each spaced at a different respective distances from said neutron source and responsive to the same neutron phenomena to produce signals that correspond to said neutron distribution in the borehole and the earth formations, and circuit means responsive to said detector signals for producing further signals that are related to the ratios of the neutron populations observed by said two detectors closest to said neutron source, $R_{near}$, and said two detectors spaced most distant from said neutron source, $R_{far}$, according to the equation:

$$L_{formation}(1-\alpha) = f(R_{far}) - \alpha g R_{near})$$

where $L_{formation}$ is the relaxation length of the neutrons in the earth formations; $\alpha$ and $\beta$ are weighting factors that characterize the tool configuration; and $f$ and $g$ are functions that also characterize the tool configuration.

2. A logging tool according to claim 1 wherein said neutron source is separated from said detectors by a neutron moderator.

3. A logging tool according to claim 1 wherein said neutron source comprises an activity on the order of 20 curies.

4. A borehole tool for logging earth formations comprising a housing, a neutron source within said housing for establishing a neutron distribution within the borehole and the earth formations, three neutron detectors each spaced from said source at a different respective distance and responsive to the same neutron phenomena to produce signals that correspond to the relaxation length of neutrons in the earth formation and the borehole, circuit means responsive to said neutron detectors spaced most closely to and intermediate of the distance from said neutron source for producing a signal that corresponds to the ratio, $R_{near}$, of said neutron distribution registered by said detectors, further circuit means responsive to said intermediate and said most distantly spaced neutron detectors for producing a signal that corresponds to the ratio, $R_{far}$, of said neutron distribution registered by said detectors, and circuit means coupled to said ratio signals for producing an output signal that corresponds to the relaxation length of neutrons in the earth formation substantially according to the equation:

$$L_{formation}(1-\alpha) = f(R_{far}) - \alpha g R_{near})$$

where $L_{formation}$ is the relaxation length of the neutrons in the earth formation; $\alpha$ and $\beta$ are weighting factors that characterize tool configuration; and $f$ and $g$ are functions that also characterize the tool configuration.

5. A logging tool according to claim 4 wherein said neutron source is separated from said detectors by a neutron moderator.

6. A logging tool according to claim 4 wherein said neutron source comprises an activity on the order of 20 curies.